United States Patent Office 2,782,562
Patented Feb. 26, 1957

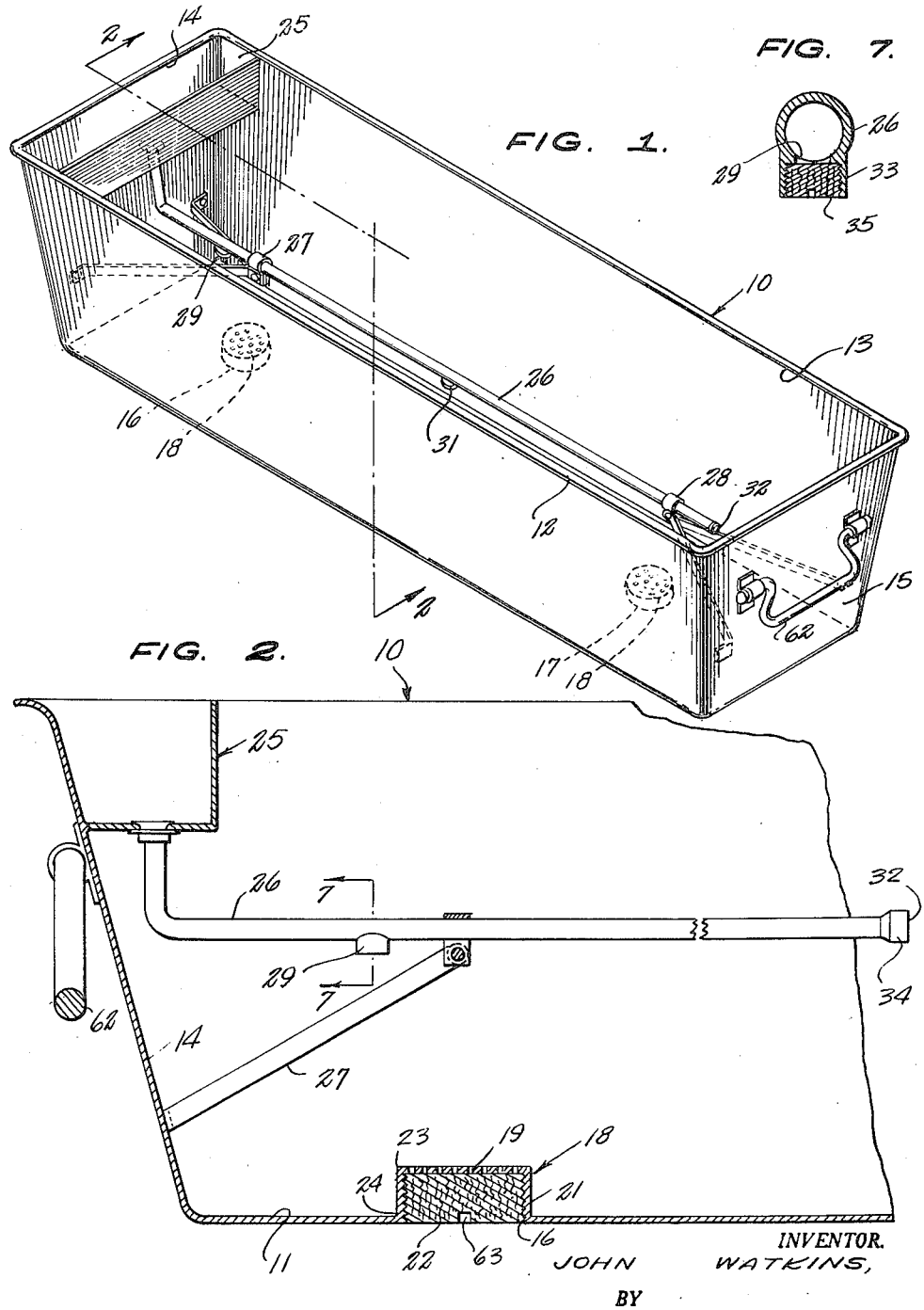

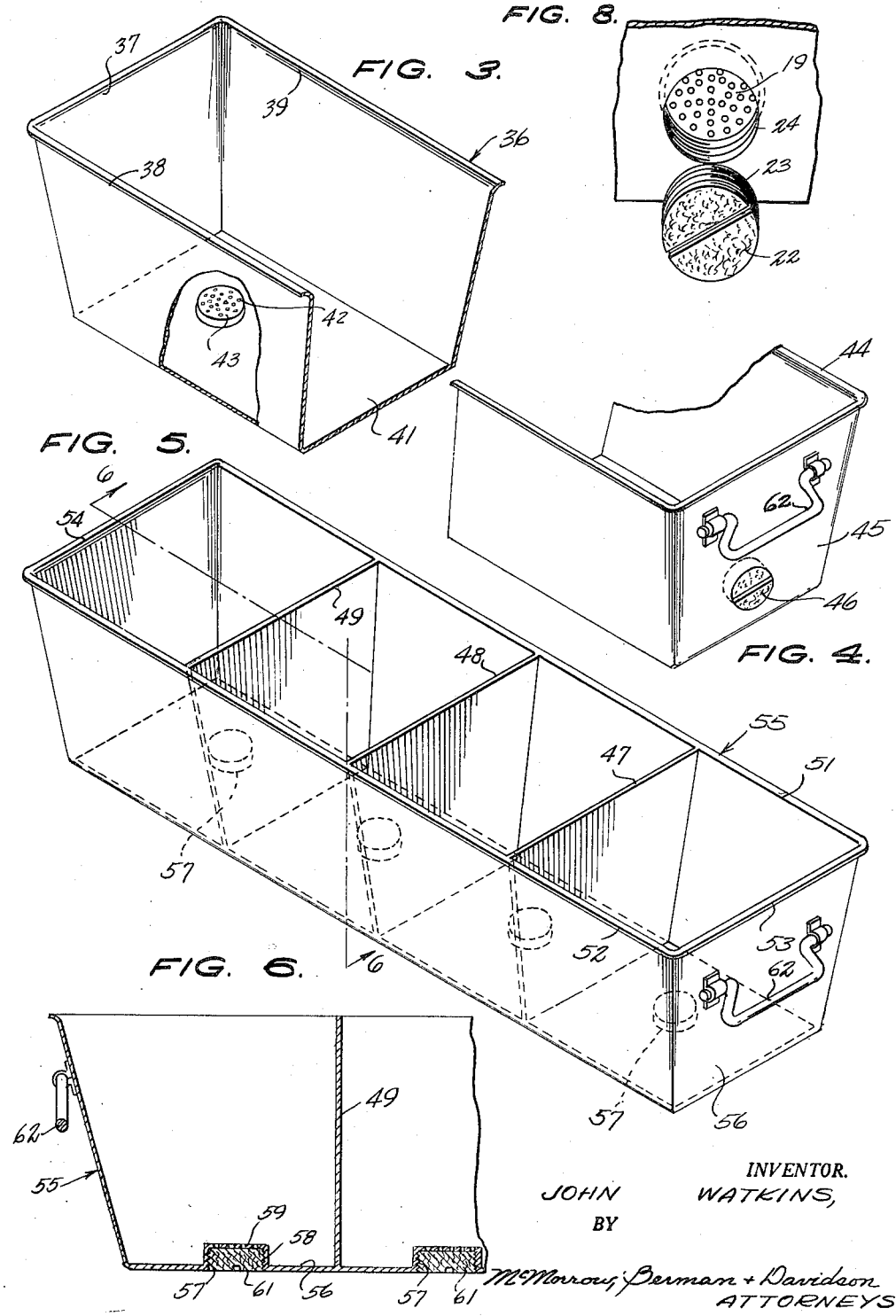

2,782,562

FLOWER BOX

John Watkins, Buffalo, N. Y.

Application August 26, 1955, Serial No. 530,753

2 Claims. (Cl. 47—38)

The present invention relates to a box for growing flowers, vegetables, or other plants.

An object of the present invention is to provide a flower box which includes means permitting the slow drainage of water therefrom.

Another object of the present invention is to provide a flower box which includes means permitting the aerating of the soil within the box.

A further object of the present invention is to provide a flower box which includes means for retaining the soil within the box while permitting irrigating water to drain therefrom and includes means for filtering the water as it drains from the box so as to retain the soil and nutrients in the box while draining.

A still further object of the present invention is to provide a flower box which includes means for supplying irrigating water to the soil within the box below the top of the soil.

These and other objects and advantages of the present invention will be fully apparent from the following description when taken in connection with the annexed drawings, in which:

Figure 1 is an isometric view of the flower box of the present invention, showing in dotted lines the filter units in the bottom of the box, Figure 2 is a fragmentary sectional view of the assembly of Figure 1, on an enlarged scale, taken on the line 2—2 of Figure 1, Figure 3 is an isometric view of a portion of another form of the present invention showing one side wall of the box broken away, Figure 4 is another isometric view of a portion of still another form of the present invention showing the filter unit in the end wall thereof, Figure 5 is an isometric view of still another form of the present invention, Figure 6 is a fragmentary sectional view, on an enlarged scale, taken on the line 6—6 of Figure 5, Figure 7 is a sectional view, on an enlarged scale, taken on the line 7—7 of Figure 2, and Figure 8 is an exploded view, on an enlarged scale, of one of the filter units of the present invention shown with the filter unit exteriorly of the opening in the wall or bottom of the flower box.

Referring to Figures 1 and 2, a flower box constructed according to the present invention is designated generally by the reference numeral 10 and comprises a flat bottom 11, a pair of upstanding side walls 12 and 13, and end walls 14 and 15 extending between and attached to the adjacent ends of the side walls 12 and 13. The bottom, side, and end walls form an enclosure for housing a mass of soil. The flat bottom 11 has a pair of openings 16 and 17 arranged in spaced relation with respect to each other and spaced from the side walls 12 and 13 and the end walls 14 and 15.

A cup, indicated generally by the reference numeral 18, having a perforated bottom 19 and a side wall 21 extending about the boundary of the bottom 19 is positioned within the enclosure formed by the flower box bottom, side walls, and end walls adjacent each of the openings and is so positioned that the perforated bottom 19 is spaced above the flat bottom of the flower box with the free edge of the cup side wall 21 surrounding the adjacent opening and secured to the flat bottom 11.

A solid plug 22 fabricated of filtering material and conformably shaped to fit within the inverted cup in insertable into each of the openings 16 and 17 in the bottom of the flower box and in the adjacent cup 18 from a point exteriorly of the flat bottom 11 of the flower box. As an example, the solid plug of filtering material may be a porous mass fabricated wholly of brass.

One of the plugs is shown in isometric view in Figure 8 and is shown to have threads exteriorly thereof cooperating with threads on the inner face of the cup side wall for releasably securing each of the plugs 22 in the adjacent cup 18. The threads on the plug are indicated by the numeral 23 and the threads on the cup side wall are indicated by the numeral 24.

A trough 25 is positioned within and adjacent the upper end of the enclosure formed by the flower box bottom, side walls, and end walls, and extends transversely between the side walls of the flower box adjacent the end wall 14. The trough is of a size to contain a supply of irrigating water.

A conduit 26 is horizontally disposed within the enclosure spaced above the flat bottom 11 of the flower box and is supported upon upwardly-extending brackets 27 and 28 which project from the end walls 14 and 15, respectively, inwardly of the enclosure and respective end walls and is connected to the conduit 26 at a point adjacent each of its ends. The conduit 26 has a plurality of discharge openings 29, 31, and 32, arranged in spaced relation therealong. The conduit 26 has one end connected in communication with the trough 25 and its other end constitutes the discharge opening 32.

Connected in communication with each of the discharge openings 29 and 31 in the pipe 26 is a vertically-disposed sleeve 33. Another sleeve 34 extends outwardly from the free end of the conduit 26 and surrounds the discharge opening 32 therein and is fixedly secured to the free end of the conduit 26. The sleeve 33 receives a filter plug 35 fabricated of a filtering material and conformably shaped to fit within the sleeve 33, as shown most clearly in Figure 7.

The plug 35 has threads on its exterior which engage threads on the internal wall of the sleeve 33. Each of the sleeves 33 is so provided with plugs 35 and the sleeve 34 on the end of the conduit 26 is similarly provided with a plug 35.

In Figure 3 is shown another form of the flower box of the present invention in which the flower box is designated generally by the reference numeral 36 and is shown with one end cut away. The flower box 36 has an end wall 37 and side walls 38 and 39, and a bottom 41 in which is an opening closed by a cup 42 having a perforated bottom 43. Within the cup 42 is a filter disk or plug similar to the plug 35.

In Figure 4 another form of the invention is shown in which the flower box designated by the reference numeral 44 is provided with an end wall 45 in which is an opening closed by a cup having a perforated bottom (not shown) the cup holding a filter plug similar to the plug 35, the plug in this view being indicated by the reference numeral 46.

In Figure 5 another form of the flower box constructed according to the present invention is shown in which there are a plurality of vertically-disposed partitions 47, 48, and 49 arranged transversely of the enclosure formed by the side walls 51 and 52 and the end walls 53 and 54 of this flower box, the latter being indicated generally by the reference numeral 55. The partitions 47, 48, and 49 each have their side edges fixedly secured to the adjacent portions of the side walls 51 and 52 and to the bottom 56 of the flower box 55. There is an opening 57 in the flat bottom 36 intermediate each of the end walls 53 and 54 in the adjacent partitions 47 and 49, respectively, and an opening between the adjacent partitions 47 and 48 and between the adjacent partitions 48 and 49, each of the openings 57 being disposed intermediate and spaced from the partitions, side walls, and respective end walls.

Referring to Figure 6, it will be seen that a cup 58 having a perforated bottom 59 surrounds each of the openings 57 in the flat bottom 56 and a plug 61 is threadedly received within each of the cups 58.

Handles 62 are provided for the ends of the flower boxes 10, 44, and 55.

In use, soil is loosely packed within the flower box 10 and irrigating water and liquid nutrients are contained within the trough 25 and are dispensed through the conduit 26 below the surface of the mass of soil contained within the flower box 10. The filter plug 35 in each of the dispensing or discharge openings in the conduit 26 permits the slow feeding of water to the roots of the plants contained in the soil. The filter plugs 22 within each of the openings in the bottom of the flower box 10 permits the aerating of the soil and also the drainage of excess water therefrom. The filter plugs 22 may be removed from their respective cups for cleaning, a saw kerf, indicated by the reference numeral 63, being provided for engagement with a screwdriver or other tool.

The flower boxes 36 and 44 shown in Figures 3 and 4, respectively, are used without any special means for providing irrigating with water or nutrients to the soil to be contained therein but are provided with drainage plugs of the same type used in the embodiment of the invention shown in Figures 1 and 2 in their bottom and end, respectively.

The flower box 55 shown in Figures 5 and 6 provides a means for adjusting the soil conditions to a plurality of different plants, the separate filter plugs 61, each of which may be removed and replaced with a solid plug, permit the adjusting of the fluid drainage from each of the compartments formed within the flower box 55 according to the needs of the particular plant contained within that compartment.

What is claimed is:

1. A flower box comprising a flat bottom, a pair of upstanding side walls rising from said bottom, and an end wall between and attached to the adjacent ends of said side walls and forming an enclosure for housing a mass of soil, said flat bottom having a plurality of openings arranged in spaced relation with respect to each other and spaced from said side and end walls, a cup having a perforated bottom and a side wall extending about the boundary of said bottom positioned within said enclosure so that the perforated bottom is spaced above said flat bottom with the free edge of the cup side walls surrounding each of said openings and secured to said flat bottom, a solid plug fabricated of filtering material and conformably shaped to fit within the inverted cup insertable into each of said openings and the adjacent cup from a point exteriorly of said flat bottom, and cooperating means on each of said plugs and cup side wall of the adjacent cup for releasably securing said plug to said cup.

2. A flower box comprising a flat bottom, a pair of upstanding side walls rising from said bottom, and an end wall between and attached to the adjacent ends of said side walls and forming an enclosure, a plurality of transverse upstanding partitions arranged in spaced relation within said enclosure subdividing said enclosure into a plurality of compartments for holding separate masses of soil, each partition having its edges fixedly secured to the adjacent portion of said side walls and said flat bottom, said flat bottom having an opening intermediate and spaced from each end wall and the adjacent one of said partitions spaced from said side walls and an opening intermediate and spaced from the adjacent ones of said partitions spaced from said side walls, a cup having a perforated bottom and a side wall extending along the boundary of said bottom positioned within each of said compartments so that the perforated bottom is spaced above said flat bottom with the free edge of the cup side walls surrounding the adjacent opening and secured to said flat bottom, a solid plug fabricated of filter material and conformably shaped to fit within the inverted cup insertable into each of said openings and the adjacent cup from a point exteriorly of said flat bottom, and cooperating means on each of said plugs and the cup side wall of the adjacent cup for releasably securing said plug to said cup.

References Cited in the file of this patent
UNITED STATES PATENTS

| 1,992,878 | Muller | Feb. 26, 1935 |

FOREIGN PATENTS

| 467,955 | Great Britain | June 25, 1937 |
| 54,894 | Germany | Jan. 12, 1891 |